US005824954A

United States Patent [19]

Biche et al.

[11] Patent Number: 5,824,954

[45] Date of Patent: Oct. 20, 1998

[54] SEALED INTERCONNECTION DEVICE

[75] Inventors: Barton A. Biche, Redwood City; Eric David Nyberg, Belmont; James Elms Swett, Jr., Fremont, all of Calif.

[73] Assignee: Raychem Corporation, Menlo Park, Calif.

[21] Appl. No.: 876,830

[22] Filed: Jun. 16, 1997

Related U.S. Application Data

[63] Continuation of Ser. No. 500,379, Jul. 10, 1995, abandoned.

[51] Int. Cl.$^{6}$ .................................................... H02G 15/02

[52] U.S. Cl. ........................ 174/74 A; 174/84 R; 174/93

[58] Field of Search ............................... 174/84 R, 74 R, 174/74 A, 76, 72 C, 77 R, 88 R, 92, 93

[56] References Cited

U.S. PATENT DOCUMENTS

| | | | |
|---|---|---|---|
| 3,241,095 | 3/1966 | Phillips | 339/94 |
| 3,322,885 | 5/1967 | May et al. | 174/78 X |
| 3,359,361 | 12/1967 | Oakman | 174/76 |
| 3,675,767 | 7/1972 | Taylor | 206/655 X |
| 3,721,749 | 3/1973 | Clabburn et al. | 174/88 |
| 4,337,374 | 6/1982 | Smith | 174/138 F |
| 4,413,028 | 11/1983 | Diaz | 428/36 |
| 4,600,261 | 7/1986 | Debbaut | 339/116 |
| 4,690,831 | 9/1987 | Uken et al. | 427/44 |
| 4,716,183 | 12/1987 | Gamarra et al. | 522/80 |
| 4,741,709 | 5/1988 | Jervis | 439/521 |
| 4,777,063 | 10/1988 | Dubrow et al. | 427/44 |
| 4,824,390 | 4/1989 | Crane et al. | 439/271 |
| 4,832,248 | 5/1989 | Soni et al. | 228/56.3 X |
| 4,864,725 | 9/1989 | Debbaut | 29/871 |
| 4,865,905 | 9/1989 | Uken | 428/220 |
| 4,883,945 | 11/1989 | Raychem Corporation | 219/541 |
| 4,909,756 | 3/1990 | Jervis | 439/521 |
| 4,972,042 | 11/1990 | Seabourne et al. | 174/23 R |
| 5,079,300 | 1/1992 | Dubrow et al. | 525/106 |
| 5,104,930 | 4/1992 | Rinde et al. | 524/871 |
| 5,149,736 | 9/1992 | Gamarra | 524/490 |
| 5,191,172 | 3/1993 | Garganese | 174/74 A |
| 5,378,879 | 1/1995 | Monovoukas | 219/634 |

FOREIGN PATENT DOCUMENTS

| | | | |
|---|---|---|---|
| 0 328 386 A2 | 8/1989 | European Pat. Off. | H01R 13/52 |
| 3709443 | 10/1988 | Germany | 174/84 R |
| 4015816-C2 | 5/1994 | Germany . | |
| WO 86/01634 | 3/1986 | WIPO . | |
| WO 88/00603 | 1/1988 | WIPO . | |
| WO 90/05166 | 5/1990 | WIPO . | |
| WO 91/05014 | 4/1991 | WIPO . | |
| WO 93/23472 | 11/1993 | WIPO . | |

*Primary Examiner*—Kristine L. Kincaid
*Assistant Examiner*—Chau N. Nguyen
*Attorney, Agent, or Firm*—Herbert G. Burkard; Sheri M. Novack

[57] ABSTRACT

An electrical interconnection device including an electrical element and a sealing member sealed within a body. The body is constructed of a first section and a second section bonded together to form an enclosure for retaining the electrical element and sealing member. Sealed passageways extend from the sealing member to the electrical element. Substrates are inserted through the sealing member into the passageways for connection to the electrical element.

20 Claims, 2 Drawing Sheets

SEALED INTERCONNECTION DEVICE

This application is a continuation of application Ser. No. 08/500,379, filed 10 Jul. 1995 now abandoned.

This invention relates to a sealed device for interconnecting substrates.

BACKGROUND OF THE INVENTION

Wire splicing in automotive electrical harnesses is typically done by crimping or welding wires to be spliced and then covering the joint to insulate and seal. Splicing operations are generally considered to be craft sensitive and, therefore, difficult to control. While the wiring is done on a harness jib, the splicing must be done off of the harness board which increases material handling.

Splice packs are essentially electrical connectors used as a common connection of multiple wires. Generally, the pin side is simply a cap that contains one or more bus bars to mate with socket contacts in the body. When creating a splice, wires connected thereto are treated the same as those going to standard connectors. Contacts are crimped in place, which is a highly automated and controlled operation. Contacts are inserted into connectors on the harness board, in a manner similar to other wires. When the cap is assembled to the body, the wires are connected to each other by the internal bus bars. Splice packs can create either splices or they may contain a tab to connect contacts to ground.

Sealed splice packs currently exist; however, they are very large. Smaller splice packs do exist; however, they are not sealed.

SUMMARY OF THE INVENTION

We have designed an interconnection device which is small and sealed. The device of the present invention may be used to interconnect any size of substrate, may be interconnected automatically and is not sensitive to craftsmanship.

A first aspect of the invention comprises a sealed electrical interconnection device comprising:

- a body comprising:
  - a first section and a second section bonded together to form an enclosure having an open edge;
  - a passageway for receiving a substrate extending from said open edge;
- an electrical element disposed in said enclosure at the end of said passageway opposite said open edge; and
- a sealing member disposed in said enclosure at the end of said passageway adjacent said open edge.

A further aspect of the invention comprises a sealed electrical interconnection device comprising:

- a body comprising:
  - a first section and a second section bonded together to form an enclosure having an open edge, the first section and second section comprising multiple layers of polymeric film;
  - a passageway for receiving a substrate extending from said open edge;
- an electrical element retained in said enclosure at the end of said passageway opposite said open edge; and
- a gel disposed in said enclosure at the end of said passageway adjacent said open edge for sealing the passageway.

DETAILED DESCRIPTION OF THE PREFERRED EMBODIMENTS

Figure 1:
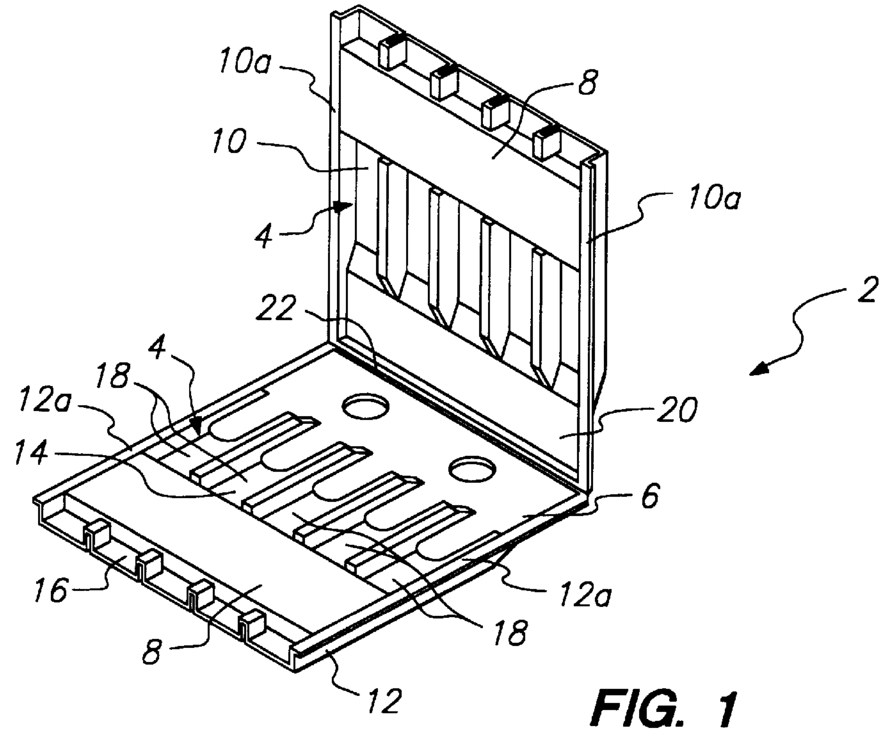
FIG. 1 illustrates the electrical interconnect device of the present invention prior to being sealed.
Figure 2:
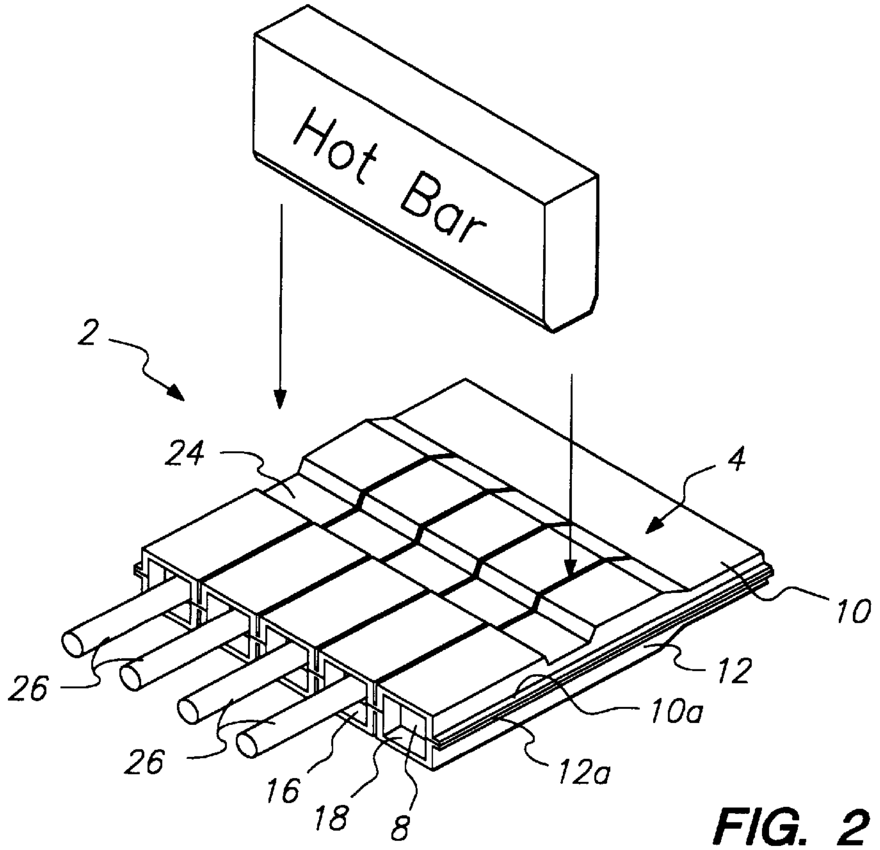
FIG. 2 illustrates the sealed electrical interconnect device of the present invention.

Referring now to the drawings, FIGS. 1 and 2 illustrate an electrical interconnection device 2 including a body 4, an electrical element 6 and a sealing member 8.

Body 4 comprises a first section 10 and a second section 12 bonded together along edges 10*a*, 12*a* to form an enclosure 14 having an open edge 16. Enclosure 14 includes passageways 18 extending from open edge 16 for receiving a substrate such as a wire, to a retaining portion 20 of the enclosure. Electrical element 6 is retained within enclosure 14 in retaining portion 20. Sealing member 8 is located in enclosure 14 adjacent open edge 16, at the opposite end of passageways 18 from the electrical element.

Sections 10, 12 are preferably constructed of multiple layers of polymeric film, more preferably expanded film bonded together to form enclosure 14. It should be noted, however, that sections 10, 12 may be a variety of constructions, for example, formed, molded or extruded parts. Prior to bonding sections 10, 12 together, electrical element 6 and sealing member 8 are inserted into enclosure 14 so as to be sealed therein when the sections are bonded together. In the preferred embodiment, sections 10, 12 are mirror images of each other, formed integrally with each other along a common edge 22. The sections are folded over each other at common edge 22, which aids in aligning the sections along edges 10*a*, 12*a* with each other so as to mate perfectly, thereby forming enclosure 14, including passageways 18 and retaining section 20.

Figure 3:
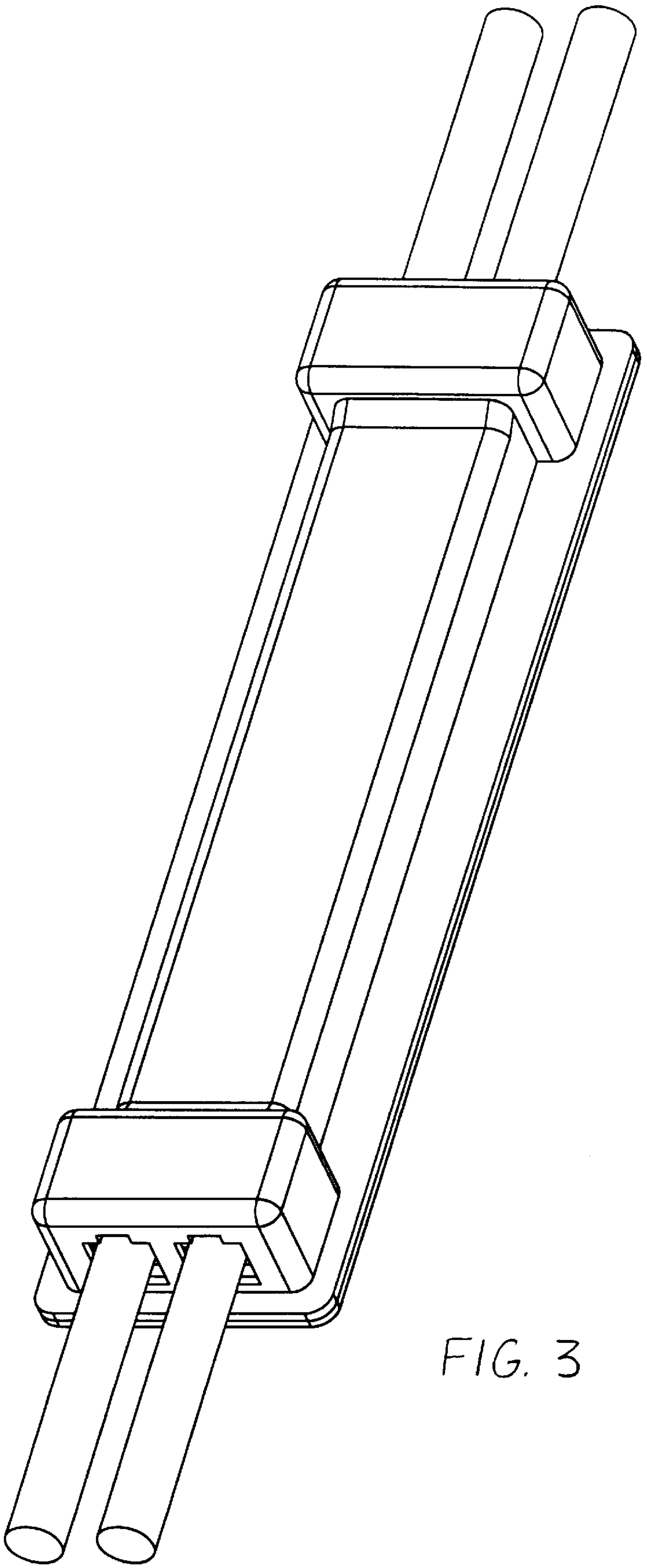
FIG. 3 illustrates an alternative embodiment of the present invention.

Unless restrained by passageways 18, open edge 16 preferably has a configuration such that at least one dimension is smaller than a corresponding dimension of electrical element 6. In this way, the electrical element is retained within enclosure 14. Alternatively, interconnection device 2 may have more than one open edge through which substrates may be inserted for connection to electrical element 6. For example, the interconnection device may include open edges facing in opposite directions such that substrates may be inserted from multiple directions or electrical elements may be oriented such that open edges are stacked, as shown in FIG. 3.

Electrical element 6 may be any electrical joining device, such as a splice, a ground, a circuit protection device, a printed circuit device, or any of a number of electrical elements for which it is desirable to connect substrates thereto. Electrical element 6 is placed in retaining portion 20 prior to bonding sections 10, 12 together, as discussed above. The configuration of electrical element 6, enclosure 14 and retaining portion 20 are such that once sections 10, 12 are bonded together, the electrical element cannot be removed from the enclosure.

Electrical element 6 is preferably relatively flat when sealed interconnection device 2 has only a first and second section; however, body 4 may be constructed of more than two sections, such that the electrical element may have a more three dimensional configuration. Additionally, multiple electrical elements may be included in enclosure 14. Multiple electrical elements may or may not be isolated from every other electrical element.

Sealing element 8 may be any sealing material, for example, a gel as described below; a hot melt adhesive seal as described in U.S. Pat. No. 4,972,042 to Seabourne et al issued on Nov. 20, 1990; or sealed by induction heating as described in U.S. Pat. No. 5,378,879 to Monovoukas issued on Jan. 3, 1995. The disclosures of each of these patents is incorporated herein by reference for all purposes. Sealing element 8 is placed in enclosure 14 at the end of passageways 18 prior to bonding the body sections together. Passageways 18 are substantially free of sealing material. As discussed above, interconnection device 2 is relatively small. Sealing member 8 has a maximum thickness (the dimension through which a substrate passes when inserted into the device through passageways 18) of 0.5 inches, preferably not larger than 0.25 inches, and most preferably not larger than 0.12 inches.

The preferred embodiment employs gel as a sealing material. Gels are desirable because their properties allow resealing and reuse. The composition is preferably obtained by blending at least one prepolymer with an extender and a particulate filler, and then subjecting the blend to conditions which convert the prepolymer into gel. The gel is a substantially dilute crosslinked system which exhibits no flow when in the steady-state. The crosslinks, which provide a continuous network structure, may be the result of physical or chemical bonds, crystallites or other junctions, and must remain intact under the use conditions of the gel. Most gels comprise a fluid-extended polymer in which a fluid, e.g., an oil, fills the interstices of the network.

Gels useful in the present invention include those comprising silicone, for example, a polyorganosiloxane system, polyurethane, polyurea, anhydride polymer containing gels such as anhydride modified EPDM, styrene-butadiene copolymers, styrene isoprene copolymers, styrene-(ethylene/propylene)-styrene (SEPS) block copolymers (available under the tradename Septon™ by Kuraray), styrene-(ethylene-propylene/ethylene-butylene)-styrene block copolymers (available under the tradename Septon™ by Kuraray), and/or styrene(ethylene/butylene)-styrene (SEBS) block copolymers (available under the tradename Kraton™ by Shell Oil Co.).

Suitable extender fluids include mineral oil, vegetable oil, paraffinic oil, silicone oil, plasticizer such as trimellitate, or a mixture of these, generally in an amount of 30 to 90% by weight, based on the total weight of the gel. The gel may be a thermosetting gel, for example silicone gel, in which the crosslinks are formed through the use of multifunctional crosslinking agents, or a thermoplastic gel, in which microphase separation of domains serves as junction points. Disclosures of gels which may be suitable as the polymeric component in the composition are found in U.S. Pat. Nos. 4,600,261 to Debbaut, 4,690,831 to Uken et al, 4,716,183 to Gamarra et al, 4,777,063 to Dubrow et al, 4,864,725 to Debbaut et al, 4,865,905 to Uken, 5,079,300 to Dubrow et al, 5,104,930 to Rinde et al, and 5,149,736 to Gamarra, and in International Patent Publication Nos. WO 86/01634 to Toy et al, WO 88/00603 to Francis et al, WO 90/05166 to Sutherland, WO 91/05014 to Sutherland, and WO 93/23472 to Hammond et al and U.S. patent application Ser. No. 08/379,859 to Mercer et al filed on Jan. 27, 1995. The disclosure of each of these patents and publications is incorporated herein by reference.

In addition, the composition may include fillers or conventional additives, including stabilizers, pigments, crosslinking agents, catalysts and inhibitors.

Sealing member 8 may be formed as a single piece of gel, or may comprise two or more precured pieces. In the most preferred embodiment, a joint line is formed between two pieces of gel. The joint line is preferably oriented such that a substrate is insertable into passageways 18 through the joint line.

A locking means 24 may be employed for locking substrates into interconnection device 2. Locking means 24 may be heat deformation of a portion of body 4 or may include physical locking means such as a mechanically locking feature formed as part of body sections 10, 12 or an additional element captivated in passageways 18.

In use, sealed interconnection device 2 is provided for connection of substrates 26 to electrical element 6. As described above, device 2 is constructed with electrical element 6 and sealing member 8 sealed within enclosure 14. One or more substrates 26 are inserted into passageways 18 through open edge 16 and sealing member 8 and connected to electrical element 6. Substrates 26 may be of any size, so long as they are capable of being inserted into device 2 through passageways 18.

A sealing member formed of gel will seal around substrates 26 as the substrates are inserted through the sealing member into enclosure 14. A sealing member formed of a hot melt adhesive seal or material sealed by induction heating must be subjected to the additional step of activating the sealing member by applying heat or subjecting to a magnetic field, as appropriate.

Substrates 26 may be locked in place by applying heat to a portion of body 4 so as to deform a portion of the body and locking the substrates in place. For example, a hot bar may be pressed against a portion of at least one of sections 10, 12, to deform the section, thereby locking substrates 26 in place. Alternatively, the act of inserting substrates 26 into enclosure 14 may activate physical locking means to prevent removal of a substrate, or adhesive, if present for any purpose, may be employed to bond the substrate in place.

The present invention thus connects the substrates to electrical element 6 using a small sealed electrical interconnection device.

Variations and modifications can be made to the present invention without departing from the scope of the present invention, which is limited only by the following claims.

We claim:

1. A sealed electrical interconnection device comprising:

a body comprising:

- a first section and a second section bonded together to form an enclosure having an open edge;
- a passageway for receiving a substrate extending from said open edge;

an electrical element sealed in said enclosure at an end of said passageway opposite said open edge; and a sealing member sealed in said enclosure at an end of said passageway adjacent said open edge.

2. The device as defined in claim 1 wherein said body comprises multiple layers of polymeric film.

3. The device as defined in claim 1 wherein said open edge has a configuration such that at least one dimension is smaller than a corresponding dimension of said electrical element, whereby said electrical element is retained within said enclosure.

4. The device as defined in claim 1 wherein said sealing member has a maximum thickness of 0.5 inches.

5. The device as defined in claim 1 wherein said passageway is substantially free of sealing material.

6. The device as defined in claim 1 wherein said open edge comprising at least two open edges and passageways extending in different directions toward respective open edges.

7. The device as defined in claim 1 wherein said sealing member comprises gel.

8. The device as defined in claim 7 wherein the gel comprises two precured pieces.

9. The device as defined in claim 8 wherein the substrate is insertable into the passageway along a joint line between the two pieces of gel.

10. The device as defined in claim 1 wherein said sealing member comprises a heat activatable adhesive seal.

11. The device as defined in claim 1 wherein said electrical element comprises a plurality of electrical elements, each of said electrical elements is isolated from each other.

12. The device as defined in claim 1 further comprising means for locking the substrate within the body.

13. The device as defined in claim 12 wherein said means for locking comprises heat deformation of at least one of said body sections.

14. The device as defined in claim 1 wherein said body sections are mirror images of each other.

15. The device as defined in claim 1 wherein said body sections are formed integrally with each other along a common edge.

16. A sealed electrical interconnection device comprising:

a body comprising:

a first section and a second section bonded together to form an enclosure having an open edge, the first section and second section comprising multiple layers of polymeric film;

a passageway for receiving a substrate extending from said open edge;

an electrical element retained and sealed in said enclosure at an end of said passageway opposite said open edge; and a gel sealed in said enclosure at an end of said passageway adjacent said open edge for sealing the passageway.

17. The device as defined in claim 16 wherein said open edge has a configuration such that at least one dimension is smaller than a corresponding dimension of said electrical element, such that said electrical element is retained within said enclosure.

18. The device as defined in claim 16 wherein said body sections are mirror images of each other and are formed integrally with each other along a common edge.

19. The device as defined in claim 16 wherein the gel comprises two precured pieces.

20. The device as defined in claim 19 wherein the substrate is insertable into the passageway along a joint line between the two pieces of gel.

* * * * *